United States Patent
Denman (10) Patent No.: US 8,854,974 B2
(45) Date of Patent: Oct. 7, 2014

(54) METHODS, SYSTEMS, AND COMPUTER READABLE MEDIA FOR DEEP PACKET INSPECTION (DPI)-ENABLED TRAFFIC MANAGEMENT FOR XDSL NETWORKS

(75) Inventor: Robert E. Denman, Plano, TX (US)

(73) Assignee: Genband US LLC, Frisco, TX (US)

( * ) Notice: Subject to any disclaimer, the term of this patent is extended or adjusted under 35 U.S.C. 154(b) by 52 days.

(21) Appl. No.: 13/344,245

(22) Filed: Jan. 5, 2012

(65) Prior Publication Data
US 2012/0176896 A1 Jul. 12, 2012

Related U.S. Application Data

(60) Provisional application No. 61/430,926, filed on Jan. 7, 2011.

(51) Int. Cl.
*H04L 12/26* (2006.01)
(52) U.S. Cl.
USPC .............. 370/236; 370/252; 370/395.21
(58) Field of Classification Search
USPC .............. 370/229, 230, 230.1, 235, 236, 252, 370/395.21
See application file for complete search history.

(56) References Cited

U.S. PATENT DOCUMENTS

| | | | |
|---|---|---|---|
| 8,250,646 B2 * | 8/2012 | Zheng .............................. | 726/13 |
| 8,280,994 B2 * | 10/2012 | Blouin et al. ................. | 709/223 |
| 8,442,030 B2 * | 5/2013 | Dennison ....................... | 370/351 |
| 2006/0233101 A1 * | 10/2006 | Luft et al. ...................... | 370/229 |
| 2007/0076607 A1 * | 4/2007 | Voit et al. ...................... | 370/230 |
| 2008/0056240 A1 * | 3/2008 | Ellis et al. ...................... | 370/352 |
| 2008/0109559 A1 * | 5/2008 | Chhabra et al. ............... | 709/238 |
| 2008/0175255 A1 * | 7/2008 | Krstulich et al. .............. | 370/401 |
| 2010/0318647 A1 * | 12/2010 | Savoor et al. .................. | 709/224 |
| 2011/0307588 A1 * | 12/2011 | Thyni et al. .................... | 709/222 |
| 2011/0320323 A1 * | 12/2011 | Cuervo ............................ | 705/30 |
| 2012/0239805 A1 * | 9/2012 | Savoor et al. .................. | 709/224 |

OTHER PUBLICATIONS

Broadband Forum, "Migration to Ethernet-Based Broadband Aggregation," Broadband Forum Technical Report, TR-101, Issue 2 (Jul. 2011).

* cited by examiner

*Primary Examiner* — Kwang B Yao
*Assistant Examiner* — Nguyen Ngo
(74) *Attorney, Agent, or Firm* — Fogarty, L.L.C.

(57) ABSTRACT

Methods, systems, and computer readable media for DPI-enabled traffic shaping for xDSL networks are disclosed. According to one method, a DPI node analyzes signaling for an xDSL network access node or a broadband network gateway to determine nodal or link capacities available to nodes upstream from the network access node or the broadband network gateway for delivering downstream traffic to the network access device. The DPI node uses the determined capacities to shape downstream traffic delivered to the network access device.

15 Claims, 3 Drawing Sheets

METHODS, SYSTEMS, AND COMPUTER READABLE MEDIA FOR DEEP PACKET INSPECTION (DPI)-ENABLED TRAFFIC MANAGEMENT FOR XDSL NETWORKS

PRIORITY CLAIM

This application claims the benefit of U.S. Provisional Patent Application Ser. No. 61/430,926, filed Jan. 7, 2011; the disclosure of which is incorporated herein by reference in its entirety.

TECHNICAL FIELD

The subject matter described herein relates to managing downstream traffic in packet networks. More particularly, the subject matter described herein relates to deep packet inspection (DPI) enabled traffic management in asymmetric digital subscriber line or symmetric digital subscriber line (xDSL) networks.

BACKGROUND

In xDSL networks, various types of traffic are sent from the network to user devices. For example, the network may send voice over IP (VoIP) traffic for voice telephony calls, file transfer traffic, and other types of traffic to user devices. A typical user device through which a user accesses an xDSL network is a DSL modem. At startup time, the DSL modem contacts an access node, referred to as a digital subscriber line access multiplexer or DSLAM, to determine the bandwidth on the connection between the DSL modem and the DSLAM. The connection between the DSLAM and the modem is referred to as the access loop. The bandwidth effectively available on the access loop depends on the user subscription, the distance between the cable modem and the DSLAM, line quality, whether or not a loop extender is used, and other factors.

The DSLAM may pass access loop bandwidth and other information to upstream nodes, such as a broadband remote access server (BRAS) or broadband network gateway (BNG). The BRAS/BNG may implement hierarchical scheduling that addresses congestion at various points in the network access topology, including taking into account access loop capabilities. However, hierarchical scheduling has not been widely implemented by BRASs or BNGs. For example, a broadband network gateway may not conform to broadband forum (BBF) specifications for hierarchical scheduling. In another example, a mix of conformant and non-conformant access nodes may result in hierarchical scheduling not being enabled at the BRAS or BNG.

Where the access service provider has not deployed hierarchical scheduling, access network topology information and access loop characteristics may nonetheless be conveyed to the BNG. The BNG may in turn convey such information to nodes outside of the access network, for example, for troubleshooting, billing, or service level agreement assurance purposes. However, as set forth above, the BNG may not use this information for hierarchical scheduling. As a result, congestion and resulting packet loss can occur when network applications try to send more data to the access loop than the access loop is capable of handling, or more data to other nodes or links in the access network than they can handle.

Accordingly, there exists a need for methods, systems, and computer readable media for DPI-enabled traffic management for xDSL networks.

SUMMARY

Methods, systems, and computer readable media for DPI-enabled traffic shaping for xDSL networks are disclosed. According to one method, a DPI node analyzes signaling from an xDSL network access node or a broadband network gateway to determine nodal or link capacities available to nodes upstream from the network access node or the broadband network gateway for delivering downstream traffic to the network access device. The DPI node uses the determined capacities to shape downstream traffic delivered to the network access device.

As used herein, the term DPI node refers to a DPI function implemented on a single computing platform or distributed across plural computing platforms.

The subject matter described herein can be implemented using a non-transitory computer readable medium having stored thereon executable instructions that when executed by the processor of a computer control the computer to perform steps. Exemplary computer readable media suitable for implementing the subject matter described herein includes: disk memory devices, chip memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings, of which.

DETAILED DESCRIPTION

Methods, systems, and computer readable media for DPI-enabled traffic management for xDSL networks are disclosed. A DPI node according to an embodiment of the subject matter described herein may be deployed in or at the edge of an xDSL network and may analyze network topology and/or access loop information made available in one or more of the following types of signaling:

Dynamic Host Configuration Protocol (DHCP) Option 82
Point-to-Point Protocol over Ethernet (PPPoE) tags
Remote Authentication Dial In User Service (RADIUS)
Diameter A DPI node according to an embodiment of the subject matter described herein may use the network topology and/or access loop information made available in the signaling to provide downstream traffic shaping and congestion management. For example, a DPI may implement traffic shaping specific to an access line's capability and/or traffic shaping specific to the capabilities of other nodes and links in the network hierarchy.

Figure 1:
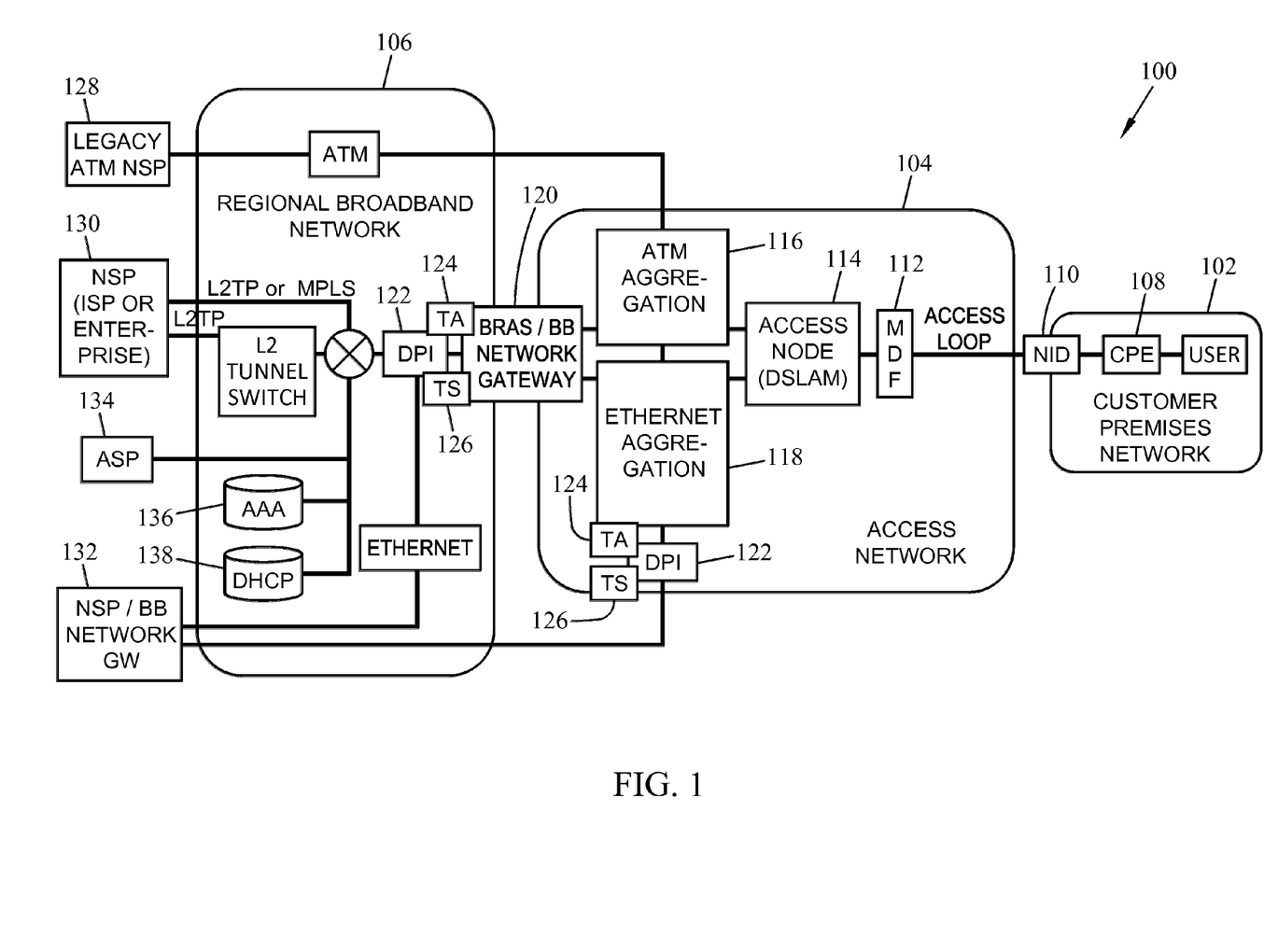
FIG. 1 is a block diagram illustrating an exemplary system for DPI-enabled traffic management for an xDSL network according to an embodiment of the subject matter described herein.

FIG. 1 is a block diagram illustrating an exemplary system for DPI-enabled traffic management for an xDSL network according to an embodiment of the subject matter described herein. Referring to FIG. 1, an xDSL network 100 includes a customer premises network 102, an access network 104, and a regional broadband network 106. Customer premises network 102 includes customer premises equipment (CPE) 108 and a network interface device (NID) 110. CPE 108 may include a DSL modem or other device used to access a broadband network. NID 110 may serve as a point of demarcation between the access-network provider's access loop and the customer's premises wiring, connecting customer premises network 102 to the access network 104. An example of NID 110 for a residential customer is the telecommunications service box located on the outside of a home.

Access network 104 includes a main distribution frame (MDF) 112, a DSLAM 114, ATM and/or Ethernet aggregation networks 116 and 118, and a broadband remote access server or broadband network gateway 120. MDF 112 is the point at which user traffic from different access loops is distributed to DSLAMs in the upstream direction and that distributes the traffic from the DSLAMs to the access loops in the downstream direction. Only a single DSLAM and a single access loop are illustrated in FIG. 1. However, it is understood that the network may include a bank of DSLAMs, each serving a group of access loops connected to a group of customer premises. ATM and Ethernet aggregation modules 116 and 118 perform ATM or Ethernet aggregation to carry traffic from the DSLAMs to nodes at the edge or outside of the access network.

According to the subject matter described herein, a DPI node 122 may be positioned to analyze signaling on the access-network side or the regional broadband network side of broadband network gateway 120, to derive from the signaling information network topology and link and access-loop capacity, and to use this information to implement traffic shaping policies. As such, DPI 122 may include a traffic analysis module 124 for analyzing the signaling traffic to determine the access network topology and nodal and link capacities, as well as user traffic that is conveyed to and from customer premises network 102. DPI 122 may also include a traffic shaping module 126 to implement traffic shaping policies for the user traffic that is conveyed to customer premises network 102.

In the illustrated example, a DPI 122 is located upstream of Ethernet aggregation module 118 and also upstream of broadband network gateway 120. As will be set forth in detail below, depending on the type of signaling being accessed, DPI 122 may be located at either or both of these locations without departing from the scope of the subject matter described herein.

Regional broadband network (RBN) 106 may provide aggregation, routing, switching, and any-to-any connectivity within the regional broadband network. Regional broadband network 106 may also provide connectivity between access network 104 and both application service providers (ASPs) and network service providers (NSPs), such as legacy ATM network service provider 128, network service providers 130 or 132, or application service provider 134. Regional broadband network 106 may include an authentication, authorization, and accounting (AAA) server 136 and a dynamic host configuration protocol (DHCP) server 138. AAA server 136 authenticates users seeking access services via a service provider's access network. AAA server 136 may use remote authentication dial in user service (RADIUS) or Diameter signaling for this and other purposes. DHCP server 138 dynamically assigns IP addresses to user devices accessing the network using the dynamic host configuration protocol. For users desiring connectivity with an NSP, such as an internet service provider (ISP) or enterprise 130, that is distinct from regional broadband network 106, the relevant AAA and/or DHCP server may reside at the NSP 130 rather than in regional broadband network 106. As will be set forth in detail below, DPI 122 may tap AAA and/or DHCP signaling to determine access network topology and capacity. Alternatively, AAA and/or DHCP signaling may transit DPI 122.

Figure 2:
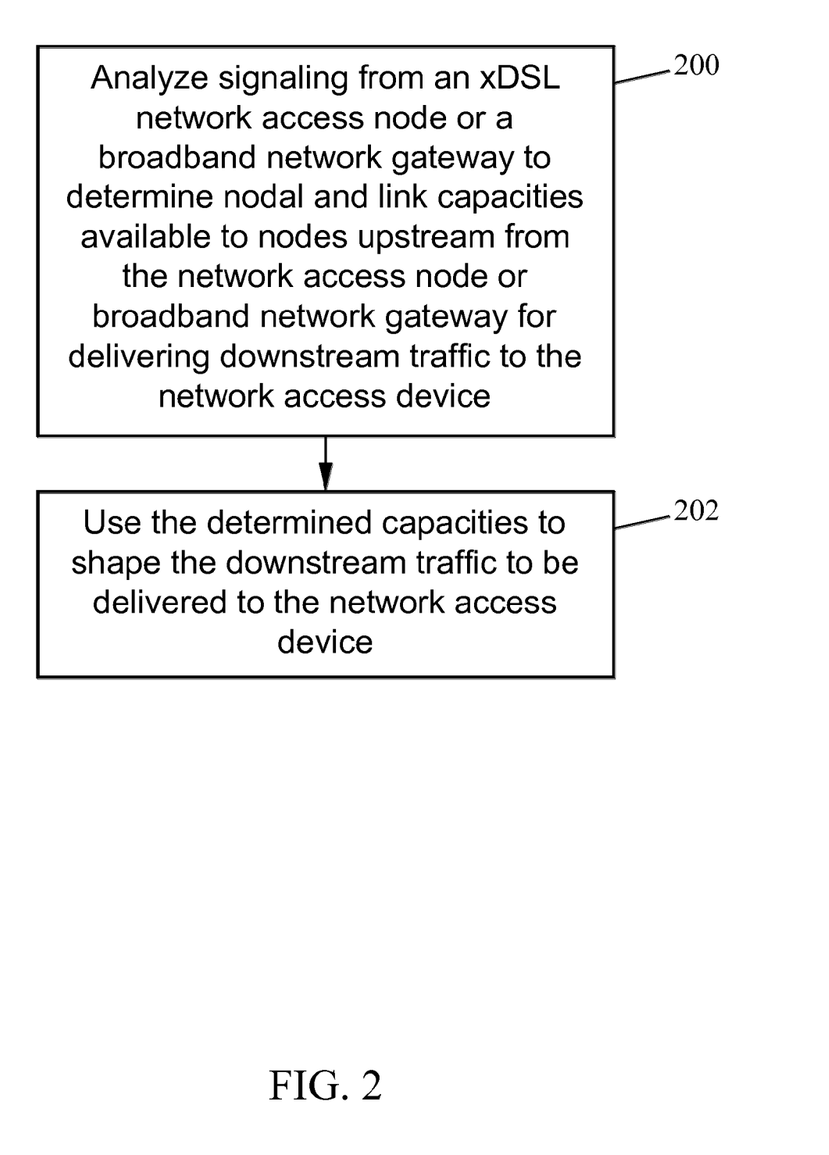
FIG. 2 is a flow chart illustrating an exemplary process for DPI-enabled traffic management according to an embodiment of the subject matter described herein.

FIG. 2 is a flow chart illustrating exemplary steps that may be performed by DPI 122 in analyzing traffic to determine nodal and link capacities of access network 104 and performing traffic shaping for downstream traffic. Referring to FIG. 2, in step 200, DPI 122 analyses signaling from an xDSL network access node 114 or broadband network gateway 120 to determine nodal and link capacities available to nodes upstream from the network access node or broadband network gateway for delivering downstream traffic to the network access device 108. For example, DPI 122 may discern the network topology and DSL line rate associated with a given user's IP address in at least one of:

BRAS/BNG RADIUS signaling that contains DSL forum vendor specific RADIUS attributes as specified in Internet Engineering Task Force Request for Comments (RFC) 4679 or the Diameter equivalent;
  DHCP signaling that may contain option 82 sub-options (as specified in IETF RFC 3046, RFC 4243, and Broadband Forum or BBF Technical Report 101 or TR-101), including DSL line characteristics; or
  PPPoE TAG information, as specified in BBF TR-101, the disclosure of which is incorporated herein by reference in its entirety.

DPI 122 may determine access loop downstream data rates from the above-referenced signaling. DPI 122 may also be provisioned with knowledge of downstream nodal and link capacities of access node 114 and BRAS/BNG 120. Whereas access loop capacity typically applies to the traffic of a single subscriber, nodal capacities of the access node 114 and BRAS/BNG 120 may limit the data rates applied to the traffic of multiple users. By using the above referenced signaling to associate users (or their IP addresses) with the BRAS/BNG 120, access node 114, and links (other than access loops) which serve them, DPI 122 may, with the provisioned capacities of the BRAS/BNG 120, access node 120, and the links, determine which nodal and link capacities apply to the aggregate traffic of users served by such nodes and links.

Returning to FIG. 2, in step 202, using the determined nodal and link capacities, DPI 122 may shape downstream traffic to be delivered to the network access device 108. For example, DSP 122 illustrated in FIG. 1 may derive hierarchical and DSL line specific downstream traffic shaping and congestion management policies or rules from the information gathered from the signaling by traffic analysis module 124. In one example, assume that DPI 122 determines that a particular user's line has a 2 megabit per second downstream capacity, and that current downstream traffic destined for this user line and passing through DPI 122 would exceed this capacity. DPI 122 may also determine that traffic currently being sent to the user includes a peer-to-peer (P2P) file transfer and a voice over internet protocol (VoIP) call. Given the available capacity, DPI 122 may determine that the VoIP call should receive higher priority than the P2P file transfer, since VoIP traffic is delay sensitive, and shape the P2P traffic flow so as to optimize the user's VoIP quality of experience (QoE).

As set forth above, one type of signaling that DPI 122 may analyze is RADIUS signaling. DPI 122 may select attributes from the RADIUS signaling that are relevant to traffic shaping. Table 1 shown below illustrates exemplary RADIUS attributes that may be extracted from network signaling by DPI 122 and how these attributes may be used to inform traffic shaping policies.

TABLE 1

RADIUS Attributes Relevant to Traffic Shaping

| Attribute | RFC | Relevance |
|---|---|---|
| NAS-IP-Address and/or NAS-Identifier | 2865 | Either IP address or identifier for BRAS/BNG must be present in Access-Request or Accounting-Request; can be used for aggregate traffic analytics and management, and qualification of NAS-Port. |
| NAS-Port and/or NAS-Port-Id | 2865, 2869 | Number or identifier for access-facing, physical BRAS/BNG port that serves user. If present in Access-Request or Accounting-Request, can enable per-port traffic analytics and management. |
| Framed-IP-Address | 2865 | Address of user. If address of user not specified in Access-Accept, it must be present in Accounting-Request. Enables association of user's IP address with other data of relevance (e.g., any identified access node, BRAS port, access-loop data rate, etc.). |
| Framed-IP-Netmask | 2865 | Found in Access-Accept and Accounting-Request, when user is a router to a network. Enables association of user's IP addresses with other data of relevance. |
| Vendor-Specific | 2865 | Container attribute for DSL-specific sub-attributes in Access-Request, Access-Accept, or Accounting-Request. Vendor-Id must be 3561, indicating ADSL Forum. |
| Agent-Circuit-Id | 4679 | Optionally found in Access-Request and Accounting-Request, describes logical access loop port of Access Node/DSLAM that serves subscriber. Syntax is implementation dependent, but typically consists of access node identifier followed by space-separated subscriber-line identifier (in terms of CPE-facing ATM or Ethernet port with VPI/VCI or any VLAN ID respectively). Can provide alternate means to identify user, as well as to enable traffic analytics and management at the level of Access Node/DSLAM and its subtending access loops. |
| Actual-Data-Rate-Downstream | 4679 | Subscriber's actual downstream data rate of a synchronized DSL link in bits per second (bps), optionally included in Access-Request and Accounting-Request. Among the access-loop data-rate sub-attributes, this is the most useful in deriving traffic-shaping policies that preclude overrunning access-loop data rates. Other sub-attributes below may be useful in the absence of this sub-attribute or in conjunction with it. |
| Minimum-Data-Rate-Downstream | 4679 | Subscriber's minimum downstream data rate in bps, as configured by the operator. Optionally included in Accounting-Request. |
| Attainable-Data-Rate-Downstream | 4679 | Optionally included in Accounting-Request, this indicates the subscriber's actual attainable downstream data rate in bps. |
| Maximum-Data-Rate-Downstream | 4679 | Optionally included in Accounting-Request, this indicates the subscriber's maximum downstream data rate in bps, as configured by the operator. |
| Minimum-Data-Rate-Downstream-Low-Power | 4679 | Optionally included in Accounting-Request, this indicates in bps the subscriber's minimum downstream data rate in low-power state, as configured by the operator. |
| Maximum-Interleaving-Delay-Downstream | 4679 | Optionally included in Accounting-Request, this indicates the subscriber's maximum one-way downstream interleaving delay in ms, as configured by the operator. Allows, for delay-sensitive traffic, accounting for delay that could be incurred by the traffic on the access loop, when formulating shaping policies which may also impose delay. |

TABLE 1-continued

RADIUS Attributes Relevant to Traffic Shaping

| Attribute | RFC | Relevance |
|---|---|---|
| Actual-Interleaving-Delay-Downstream | 4679 | Optionally included in Accounting-Request, this indicates the subscriber's actual one-way downstream interleaving delay in ms. Allows, for delay-sensitive traffic, accounting for delay that is incurred by the traffic on the access loop, when formulating shaping policies which may also impose delay. |
| Access-Loop-Encapsulation | 4679 | Optionally present in the Access-Request and Accounting-Request, this indicates the encapsulation(s) used by the subscriber on the DSL access loop. For traffic shaping purposes, this allows compensation for packet overhead from L2 encapsulation added by the Access Node, without which the attempted traffic rate could exceed the physical line rate. |

In Table 1 above, among the access-loop-specific attributes that may be used by DPI 122 for traffic shaping are the actual data rate downstream and the access loop encapsulation. The actual data rate downstream attribute gives the actual downstream data rate of a synchronized DSL link in bits per second, which is negotiated between the DSLAM and the CPE device. The access loop encapsulation attribute indicates the encapsulation used by the subscriber in the DSL access loop, which, as indicated above, allows compensation for packet overhead in layer 2 encapsulation added by the access node. If this overhead is not considered, the traffic rate allowed by DPI 122 could exceed the physical line rate. Thus, DPI 122 may utilize the actual data rate downstream parameter to initially determine a downstream data rate and may utilize the overhead caused by the encapsulation to determine a reduced downstream data rate to be enforced by traffic-shaping module 126. For example, without encapsulation the downstream data rate may be determined to be 2 megabits per second; but with 10% encapsulation overhead, the downstream data rate may be determined to be just 1.8 megabits per second. DPI 122 may enforce this rate as an inline device.

It is noteworthy that Diameter could be used in lieu of RADIUS for interaction with AAA servers related to xDSL networks, having been developed in order to address RADIUS' limitations in the areas of reliability, flexibility, and security. In the same way that IETF RFCs and BBF TRs have extended the RADIUS protocol for specific application in xDSL networks, extensions could be made to the base Diameter protocol specified in RFC 3588, which has already been extended for other applications. For example, for interaction with AAA servers in third generation partnership project (3GPP) specified access networks, 3GPP technical specification (TS) 29.061 details Diameter extensions employed, which include those specified by RFC 4005. For example, Diameter extensions may add attributes that identify the subscriber, the xDSL access loop and its downstream data rate, the access node, and/or the BRAS/BNG. Such extensions can be used to identify which subscribers are associated with which nodes, access loops, and links other than access loops. Such extensions or attributes can be used in combination with provisioned capacities for nodes and for links other than access loops to determine aggregate traffic-management policies to apply to downstream communications to the subscriber. In addition, Diameter extensions that identify downstream access loop capacities can be used to formulate policies to be applied to the subscriber at the access loop level.

As set forth above, another source of signaling that may be used by DPI 122 in determining access line and nodal capacities is DHCP signaling. Table 2 shown below illustrates some of the variations in DHCP deployment contexts, some of which can be exploited by DPI 122 to enforce policies related to nodal, link, and/or access line capacities.

TABLE 2

DHCP Parameters Relevant to Traffic Shaping

| DHCP Server Location | BRAS/BNG Capabilities | | AN/DSLAM as L2 DHCP Relay Agent | | |
|---|---|---|---|---|---|
| | DHCP Relay Agent | Option 82 | Option 82 | Option 82 DSL Line Info | Visibility Provided to DPI of Network Topology and User |
| RBN BNG | No | No | Maybe | Maybe | No DHCP visibility on Internet side of BRAS/BNG |
| In RBN | Yes | No | No | No | Associate user's IP with its MAC address & BNG's IP address |
| In RBN | Yes | Yes | No | No | Additionally associate user's IP address with BNG port (e.g., ATM virtual circuit or VC) |
| In RBN | Yes | Yes | Yes | No | Associate IP address with MAC address, access node/DSLAM port, and additional user identity, enabling user- and location-aware traffic management |
| In RBN | Yes | Yes | Yes | Yes | Additionally discern DSL line characteristics, enabling dynamic, per-line traffic shaping |

DHCP signaling can provide the same information as RADIUS with regard to traffic shaping, depending on the DHCP deployment contexts as illustrated in Table 2 above. In particular, DHCP Option 82 DSL line information data can provide per-line capacities, which can be used in traffic shaping. The DHCP server may be present in the network service provider's network and the BRAS/BNG may be located in the regional broadband network, the network service provider's network, or in both the regional broadband network and network service provider's network. Where the NSP and regional broadband network provider are distinct, if the BRAS/BNG 120 is located in the regional broadband network, DHCP traffic may be tunneled to the NSP 130. As a result, DPI 122 may have to analyze tunneled DHCP traffic to obtain the necessary DSL line characteristics. Relevant tunneling protocols include Layer 2 Tunneling Protocol (L2TP), Multiprotocol Label Switching (MPLS), and 802.1q virtual local area networks (VLANs) over Ethernet. Traffic shaping capabilities based on DHCP signaling will vary based on DHCP related configuration of the network to which the user opts to connect and the associated access node/DSLAM capabilities and per-port configuration differences on the access node/DSLAM.

The following illustrates a typical DHCP exchange that may be monitored by DPI 122:
  Client broadcasts DHCPDISCOVER, providing its own MAC address in chaddr
  DHCP servers respond with DHCP Offer, populating yipaddr (your IP addr) with the IP address offer
  Client broadcasts DHCPREQUEST to indicate the server and IP address selected (along with chaddr)
  Server sends DHCPACK, with yipaddr, subnet mask, server identifier, lease duration In order to obtain the above noted information from DPI Option 82, DPI 122 may monitor DHCP traffic to and from a DHCP relay agent, such as BNG 120. A DHCP client within a DHCP host, such as that found in within customer premises network 102, broadcasts certain messages (e.g., DHCPDISCOVER, DHCPREQUEST) within its local network, such as access network 104; when one or more DHCP servers, such as DHCP server 138, lie outside the local network, base DHCP RFC (2131) allows for a DHCP Relay Agent to unicast the DHCP message to the such servers, populating the giaddr field with its own address (for the DHCP servers' use in responses). RFC 3046 adds the DHCP Relay Agent Info option (Option 82), so as to facilitate the Agent's routing of downstream messaging to the correct source (e.g., via use of Agent port info). The Relay Agent adds Option 82 info to the upstream message, and the server sends DHCP Option 82 info back in response. The DHCP Relay Agent removes the Option 82 info before sending the response to client. RFC 3046 also made an allowance for an unnamed, downstream (toward client) trusted network element which BBF TR-101 named the L2 DHCP Relay Agent, which presents an untrusted circuit to CPE client and a trusted circuit to the DHCP Relay Agent. Intended to facilitate routing in an access network where significant aggregation occurs, the L2 DHCP Relay Agent, such as Access Node/DSLAM 114, adds/strips Option 82 info, and the DHCP Relay Agent handles giaddr. RFC 3046 specifies two suboptions: Agent Circuit ID, identifying the access loop, and Agent Remote ID, which may refine Agent Circuit ID information by identifying the user on the access loop. RFC 4243 further allows for a container suboption for vendor-specific information, where DSL Forum is deemed a vendor. This container suboption can be populated with additional xDSL-access specific information, such as the access-loop characteristics specified in Appendix D of BBF TR-101, wherein the Type/Length/Values (TLVs) listed in Table 3 have relevance for informing downstream traffic-shaping policies.

TABLE 3

DSL Line Characteristics DHCP Type Definition
DSL Line Characteristics DHCP Type Definitions

| Type | Length | Value | Value Type |
|---|---|---|---|
| 0x82 | 4 | Actual data rate Downstream in kb/s | 32 bit binary value |
| 0x84 | 4 | Minimum Data Rate Downstream in kb/s | 32 bit binary value |
| 0x86 | 4 | Attainable Data Rate Downstream in kb/s | 32 bit binary value |
| 0x88 | 4 | Maximum Data Rate Downstream in kb/s | 32 bit binary value |
| 0x8A | 4 | Minimum Data Rate Downstream in low power state in kb/s | 32 bit binary value |
| 0x8D | 4 | Maximum Interleaving Delay Downstream in millisec. | 32 bit binary value |
| 0x8E | 4 | Actual Interleaving Delay Downstream in millisec. | 32 bit binary value |
| 0x90 | 3 | Access-Loop-Encapsulation | 24 bit binary value |

Note that DPI 122 may obtain visibility to RADIUS and DHCP signaling by various means:

- DPI 122 functions as a proxy server between the RADIUS or DHCP client and the server
- DPI 122 taps signaling links terminating at the RADIUS or DHCP server
- DPI 122 relays both signaling and user traffic, distinguishing signaling from other traffic
- BRAS/BNG 120 sends uplink signaling to both DPI 122 and the AAA server 136 or DHCP server 138.

Yet another source of information that can be used by DPI 122 to determine access nodal and link capacities is PPPoE tag signaling. As described in TR-101 Section 3.9 and Appendix C, the same network topology and access network information provided by RADIUS and DHCP Option 82 can be provided in the Tags of PPPoE signaling. For example, access node/DSLAM 114 may, as a PPPoE intermediate agent, add access-loop information to the PPPoE signaling exchanged between CPE 108 and BRAS/BNG 120. PPPoE signaling may be terminated at BNG/BRAS 120 or tunneled by BNG/BRAS 120 to an independent ISP or enterprise network 130 or 132. DPI 122 may be configured to analyze tunneled or non-tunneled PPPoE traffic for determining nodal and link capacities.

DPI 122 may use the PPPoE information in the same way as the RADIUS and DHCP information described above to determine access node and loop capacities and to formulate traffic shaping policies. For example, DPI 122 may use the Actual Data Rate Downstream and data link encapsulation tags to determine the effective data rate of an access loop, and may subsequently shape downstream traffic to the access loop based on this data rate.

Figure 3:
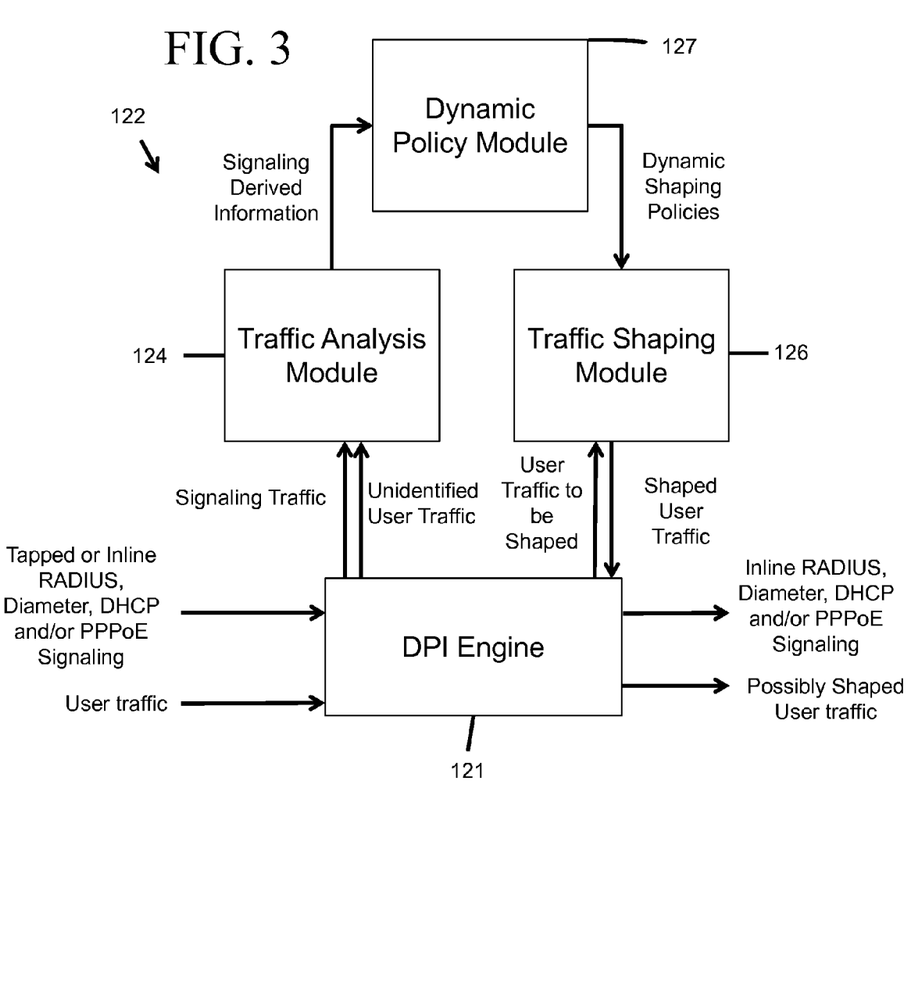
FIG. 3 is a block diagram of a stand-alone DPI node according to an embodiment of the subject matter described herein.

As set forth above, DPI 122 may implement traffic shaping through hierarchical scheduling based on knowledge of network topology and access loop characteristics. FIG. 3 is a simplified, functional block diagram of a DPI node according to an embodiment of the subject matter described herein. The depicted functions of FIG. 3 may all be hosted on a single, standalone platform, or distributed across multiple platforms; moreover, the depicted functions may each be replicated on multiple platforms. For example, traffic analysis module 124 may itself be distributed across multiple platforms for scalability purposes. For instance, analysis of user traffic may be hosted by one platform, and analysis of signaling traffic may be hosted by a different platform.

Referring to FIG. 3, DPI node 122 includes DPI engine 121, traffic analysis module 124, dynamic policy module 127, and traffic shaping module 126. Inline DPI engine 121 provides real-time handling of received user traffic—i.e., traffic that is sent to and received from the user of customer premises network 102. For user traffic that has not yet been identified or characterized, for example, as being associated with a particular application or content, DPI engine 121 provides traffic analysis module 124 with visibility to the traffic, in order that it may be identified or characterized. Where identified or characterized traffic flows have been correlated with traffic-shaping policies, DPI engine 121 sends the traffic through traffic-shaping module 126, so that the traffic may be managed per one or more relevant policies. Traffic, whether shaped or not, may then be sent onward by DPI engine 121 toward its intended destination.

DPI engine 121 may also receive signaling traffic, such as RADIUS or Diameter traffic conveyed between BRAS/BNG 120 and AAA server 136, DHCP traffic exchanged between CPE 108 and DHCP server 138, and/or PPPoE traffic exchanged between CPE 108 and one of a BRAS/BNG 120 in the regional broadband network or at the NSP 130 or 132. (As set forth above, other nodes may augment the signaling information sent upstream by CPE 108. For instance, access node 114 and/or BNG 120 may add access network information to this signaling.) The signaling received by DPI engine 121 may be tapped or received inline. Regardless, DPI engine 121 conveys the received signaling to traffic analysis module 124, where signaling received inline may be replicated for this purpose. DPI engine 121 sends onward toward its intended destination that signaling which is received inline.

As set forth above, traffic analysis module 124 may analyze certain types of signaling traffic to determine xDSL network line and nodal capacities associated with a given user, as well as to associate an IP address with the user. Traffic analysis module 124 may convey such signaling-derived information to dynamic policy module 127, which in turn may use this information, along with data that is provisioned or supplied by other means, to dynamically formulate traffic shaping policies and send these to traffic shaping module 126 for enforcement. For example, traffic shaping module 126 may thus receive a shaping policy for enforcement which ensures that the rate of downstream traffic sent to customer premises network 102 does not exceed the effective bandwidth capacity of that network's access loop.

Traffic analysis module 124 may also perform DPI for user traffic, meaning that packet payloads of such traffic flows, in addition to packet headers, may be analyzed and used to identify the content and applications associated with the traffic. For example, traffic analysis module 124 may identify application traffic using signatures specific to particular applications. VoIP traffic may have a different signature than file transfers, interactive games may have different signatures than software updates, etc. The application types associated with such signatures, along with access node and link capacities, can be used by traffic shaping module 126 to implement DSL traffic shaping policies. Where no signatures correspond to a user's traffic flow, or in conjunction with matching signatures, behavioral heuristics may be employed to characterize traffic. For example, a number of downstream, encrypted traffic flows consuming considerable bandwidth, along with relatively little, encrypted, corresponding upstream traffic, may flag a likely P2P file transfer.

As set forth above, traffic shaping module 126 may enforce traffic shaping policies based on xDSL access loop or nodal capacities, such policies being supplied by dynamic policy module 127. Dynamic policies may be enforced in conjunction with statically provisioned policies. For example, traffic shaping policies may be specific to applications or traffic type, as with the VoIP and file transfer example described above. Other examples of traffic shaping policies that may be implemented by traffic shaping module 126 include policies that prioritize interactive applications above others. For example, instant messaging, web browsing, and certain games may be prioritized over non-interactive file transfers. During periods of network congestion, traffic shaping module 126 may limit the bandwidth of certain applications, such as peer-to-peer applications, file transfer applications, and software updates. Traffic shaping module 126 may also implement quota schemes where the service plan of a subscriber may be used to determine the bandwidth allowed for a particular DSL access loop connection. For example, traffic shaping module 126 may implement traffic shaping policies that prioritize gold DSL subscribers over silver or bronze subscribers, such that the aggregate downstream traffic bandwidth for all users does not exceed the bandwidth capacity of the common access node (or DSLAM) 114 that serves them. In order to shape traffic according to a particular access loop's or node's bandwidth capacity, traffic shaping module 126 may implement a token bucket or other traffic rate-limiting scheme to prevent downstream traffic from exceeding the capacity.

It will be understood that various details of the subject matter described herein may be changed without departing from the scope of the subject matter described herein. Furthermore, the foregoing description is for the purpose of illustration only, and not for the purpose of limitation.

What is claimed is:

1. A method, comprising:
analyzing, via a deep packet inspection (DPI) node, signaling from a symmetric or an asymmetric Digital Subscriber Line (xDSL) network access node or a broadband network gateway, wherein analyzing the signaling traffic includes analyzing: (i) Dynamic Host Configuration Protocol (DHCP), (ii) point-to-point protocol over Ethernet (PPPoE), (iii) Remote Authentication Dial In User Service (RADIUS), or (iv) Diameter traffic used by the xDSL network access node or the broadband network gateway to indicate, to nodes upstream from the network access node or broadband network gateway, at least one of: (i) one or more serving nodal identities, (ii) one or more serving link identities, or (iii) one or more serving link capacities, and wherein analyzing the signaling traffic further includes: (i) analyzing one or more RADIUS attributes to determine a downstream data rate for an xDSL access loop, (ii) analyzing one or more Diameter attributes to determine the downstream data rate for the xDSL access loop, or (iii) determining a DSL access loop data rate from one or more Point-to-Point Protocol over Ethernet (PPPoE) TAGs;
deriving, by the DPI node based upon the signaling, actual nodal and link capacities available to nodes upstream from the network access node or broadband network gateway for delivering downstream traffic to the network access device; and
shaping downstream traffic to be delivered to the network access device via the DPI node based upon the determined actual nodal and link capacities.

2. The method of claim 1, wherein analyzing the signaling traffic includes analyzing one or more signaling information elements to determine access loop overhead due to encapsulation and wherein using the determined capacities to shape the downstream traffic includes determining a data rate that is lower than the downstream data rate based on the overhead due to encapsulation.

3. The method of claim 1, wherein analyzing the signaling traffic includes determining an xDSL access loop line rate from DHCP Option 82 line information.

4. The method of claim 1, further comprising using the DPI node as an inline device to limit the rate at which traffic is transmitted over an xDSL access loop.

5. The method of claim 1, wherein using the determined capacities to shape the downstream traffic to be delivered to the network access device includes selectively limiting a downstream data rate based on application type.

6. The method of claim 1, wherein using the determined capacities to shape the downstream traffic to be delivered to the network access device includes selectively limiting a downstream data rate based on subscriber tier.

7. A system, comprising:
a deep packet inspection (DPI) node including:
a traffic analysis module configured to analyze signaling from a symmetric or an asymmetric Digital Subscriber Line (xDSL) network access node or a broadband network gateway to derive actual nodal and link capacities available to nodes upstream from the network access node or broadband network gateway for delivering downstream traffic to the network access device, wherein to analyze the signaling, the traffic analysis module is configured to analyze: (i) Dynamic Host Configuration Protocol (DHCP), (ii) point-to-point protocol over Ethernet (PPPoE), (iii) Remote Authentication Dial In User Service (RADIUS), or (iv) Diameter traffic used by the xDSL network access node or the broadband network gateway to indicate, to nodes upstream from the network access node or broadband network gateway, at least one of: (i) one or more serving nodal identities, (ii) one or more serving link identities, or (iii) one or more serving link capacities, AND wherein to analyze the signaling, the traffic analysis module is further configured to: (i) analyze one or more RADIUS attributes to determine a downstream data rate for an xDSL access loop, (ii) analyze one or more Diameter attributes to determine the downstream data rate for the xDSL access loop, or (iii) determine a DSL access loop data rate from one or more Point-to-Point Protocol over Ethernet (PPPoE) TAGs; and
a traffic shaping module configured to shape downstream traffic to be delivered to the network access device using the determined capacities.

8. The system of claim 7, the DPI node further comprising a dynamic policy module configured to dynamically formulate, based on the nodal and link capacities, traffic shaping policies used by the traffic shaping module to shape the downstream traffic.

9. The system of claim 7, wherein the traffic analysis module is configured to analyze one or more signaling information elements to determine access loop overhead due to encapsulation and to determine a data rate that is lower than the downstream data rate based on the overhead due to encapsulation.

10. The system of claim 7, wherein the traffic analysis module is configured to determine an xDSL access loop line rate from DHCP Option 82 line information.

11. The system of claim 7, wherein the traffic shaping module is configured to shape traffic to be sent over an xDSL access loop by functioning as an inline device to control a rate at which traffic is sent over the xDSL access loop.

12. The system of claim 7, wherein the traffic shaping module is configured to selectively limit traffic rates based on application types.

13. The system of claim 12, wherein the traffic shaping module is configured to implement traffic shaping policies that allow different traffic rates for different application types.

14. The system of claim 7, wherein the traffic shaping module is configured to implement traffic shaping policies that selectively limit traffic rates based on subscriber tier.

15. A non-transitory computer readable medium having stored thereon executable instructions that, upon execution by a processor of a deep packet inspection (DPI) node, cause the DPI node:
analyze signaling from an a symmetric or an asymmetric Digital Subscriber Line (xDSL) network access node or a broadband network gateway to derive actual nodal and link capacities available to nodes upstream from the network access node or broadband network gateway for delivering downstream traffic to the network access device, wherein to analyze the signaling, the executable instructions, upon execution by the processor, cause the DPI node to analyze: (i) Dynamic Host Configuration Protocol (DHCP), (ii) point-to-point protocol over Ethernet (PPPoE), (iii) Remote Authentication Dial In User Service (RADIUS), or (iv) Diameter traffic used by the xDSL network access node or the broadband network gateway to indicate, to nodes upstream from the network access node or broadband network gateway, at least one of: (i) one or more serving nodal identities, (ii) one or more serving link identities, or (iii) one or more serving link capacities, and wherein to analyze the signaling, the executable instructions, upon execution by the processor, further cause the DPI node to: (i) analyze one or more RADIUS attributes to determine a downstream data rate for an xDSL access loop, (ii) analyze one or more Diameter attributes to determine the downstream data rate for the xDSL access loop, or (iii) determine a DSL access loop data rate from one or more Point-to-Point Protocol over Ethernet (PPPoE) TAGs; and use the determined capacities to shape the downstream traffic to be delivered to the network access device.

* * * * *